US006937752B2

(12) United States Patent
Chiba et al.

(10) Patent No.: US 6,937,752 B2
(45) Date of Patent: Aug. 30, 2005

(54) AUTOMATIC CURRENCY PROCESSING SYSTEM

(75) Inventors: Kyouko Chiba, Kokubunji (JP); Masato Teramoto, Nagoya (JP)

(73) Assignee: Hitachi, Ltd., Tokyo (JP)

( * ) Notice: Subject to any disclaimer, the term of this patent is extended or adjusted under 35 U.S.C. 154(b) by 758 days.

(21) Appl. No.: 09/887,068

(22) Filed: Jun. 25, 2001

(65) Prior Publication Data

US 2002/0044678 A1 Apr. 18, 2002

(30) Foreign Application Priority Data

Jun. 23, 2000 (JP) ....................................... 2000-188803

(51) Int. Cl.[7] ................................................ G06K 9/00

(52) U.S. Cl. ....................... 382/135; 209/534; 235/379; 356/71; 902/7

(58) Field of Search ................................ 382/135, 100, 382/136, 137, 138; 194/4; 209/534; 235/379; 356/71; 902/7–11; 705/43

(56) References Cited

U.S. PATENT DOCUMENTS 5,256,862 A * 10/1993 Watanabe et al. ........... 235/379
6,042,002 A * 3/2000 Ohki et al. ................. 235/379
6,131,718 A * 10/2000 Witschorik .................. 194/206

FOREIGN PATENT DOCUMENTS

GB WO00/05688 * 2/2000 ............ G07D/7/00

* cited by examiner

*Primary Examiner*—Samir Ahmed
*Assistant Examiner*—Anand Bhatnagar
(74) *Attorney, Agent, or Firm*—Antonelli, Terry, Stout & Kraus, LLP

(57) ABSTRACT

There is provided an automatic processing apparatus which can protect the secret items of the validator, easily provide a measure for change of bank note and reduce the manufacturing cost. A validation processing unit provided in the side of an automatic processing apparatus to validate the bank note is mounted in the side of a host computer and a unit for transferring the feature data obtained with the sensor unit to the host computer from the automatic processing apparatus and a unit for transferring the validation result obtained with the validation processing unit to the automatic processing apparatus from the host computer are also provided. On the occasion of executing the discrimination process with one unit or a plurality of units of the host computer for a plurality of automatic processing apparatuses, the apparatus ID number for validating the feature data and apparatus is transferred to the host computer from the automatic processing apparatus.

24 Claims, 4 Drawing Sheets

AUTOMATIC CURRENCY PROCESSING SYSTEM

BACKGROUND OF THE INVENTION

The present invention relates to an automatic processing apparatus comprising a bank note validator such as a cash dispenser or an automatic teller machine installed for various processes such as deposit and disbursement depending on user's manipulation in a financial institution and particularly to an automatic processing apparatus and bank note validating method which have improved security by executing the money validation process in the host computer side.

An automatic processing apparatus used in a financial institution has been constituted of various units such as a bank note deposit/disbursement unit for receiving or transferring bank note to or from a customer, a validating unit for validating bank note deposited and a bank note stacking unit. Among these units, the bank note transfer paths and gates for determining the transfer path for the bank note are provided. The validating unit which is one of these units is provided to discriminate the denomination of bank note deposited and also determine the true or false bank note. The validating unit is constituted of a sensor unit for detecting various features of the bank note, a memory unit for storing the feature data obtained from the sensor unit and a validation processing unit for validating the denomination of bank note from its feature data. These units are all provided within the automatic processing apparatus.

As explained above, since the automatic processing apparatus of the related art is provided with the validation processing unit for determining the denomination of bank note in its inside and therefore results in various problems that (a) if the apparatus is stolen, the validator that is the secret matter for discrimination is made public, (b) it is required to modify the validation processing unit, if the features of bank note are changed or if a measure for various kinds of bank note of respective countries is added, but such modification must be made for each automatic processing apparatus, and (c) since the validation processing unit is mounted to each automatic processing unit, memories for data storing and working are required, resulting in rise of manufacturing cost.

The official gazette, Japanese Laid-Open Patent Application NO. 2000-348234 discloses the technique in which the rough true/false discrimination process is executed in the automatic processing apparatus as the initial stage of discrimination and detail true/false discrimination process is executed in the host computer. However, even in this prior art, the modification work of each apparatus and the memory for storing data for rough true/false discrimination are still required, if the feature data of bank note is changed.

SUMMARY OF THE INVENTION

It is therefore an object of the present invention to provide an automatic processing apparatus and a bank note validating method which can solve the problems of the prior art and assure the security of the secret mechanism even if the automatic processing apparatus is stolen.

Moreover, it is another object of the present invention to provide an automatic processing apparatus and a bank note validating method that requires modification at only one area and can assure improvement in the working efficiency of such modification even in the case of adding the bank note of the other denominations.

Moreover, it is the other object of the present invention to provide an automatic processing apparatus and a bank note validating method that can reduce the manufacturing cost of the apparatus on the occasion of mounting the validation processing unit.

DETAILED DESCRIPTION OF THE PREFERRED EMBODIMENT

A preferred embodiment of the present invention will be explained in detail with reference to the accompanying drawings.

Figure 1:
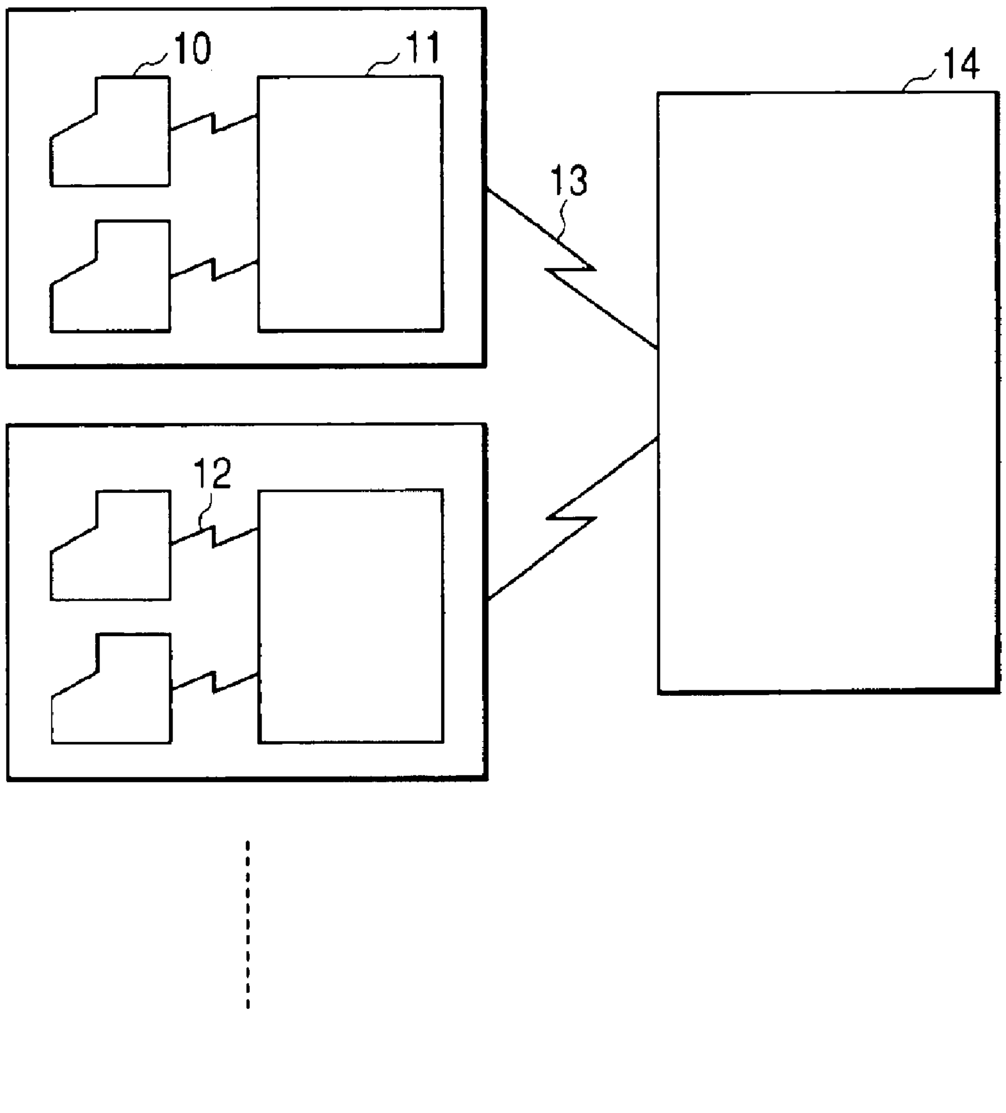
FIG. 1 is a structural diagram of an automatic currency processing system as a preferred embodiment of the present invention.

FIG. 1 is a structural diagram of an automatic currency processing system as a preferred embodiment of the present invention.

In each bank, a plurality of automatic processing apparatuses 10 are connected with a host computer 11 installed in each business branch. Moreover, a host computer such as a management center 14 or the like are respectively linked with respectively communication lines 13.

In the present invention, a sensor unit for reading features of the image data is provided within the automatic processing apparatus 10 and moreover the validation processing unit for validating the bank note based on such feature data is provided within the host computer 11 or within the management center 14. Here, it is also possible to provided the validation processing unit within the host computer (management center) comprising a database for storing the account number and balance for the deposit, disbursement or transfer processes. Moreover, it is of course possible to provide a validation processing unit to the other host computer different from the management center. In this case, it is no longer required to execute the update of data for each host computer 11 of the business branches and thereby availability of the system can further be improved.

Figure 2:
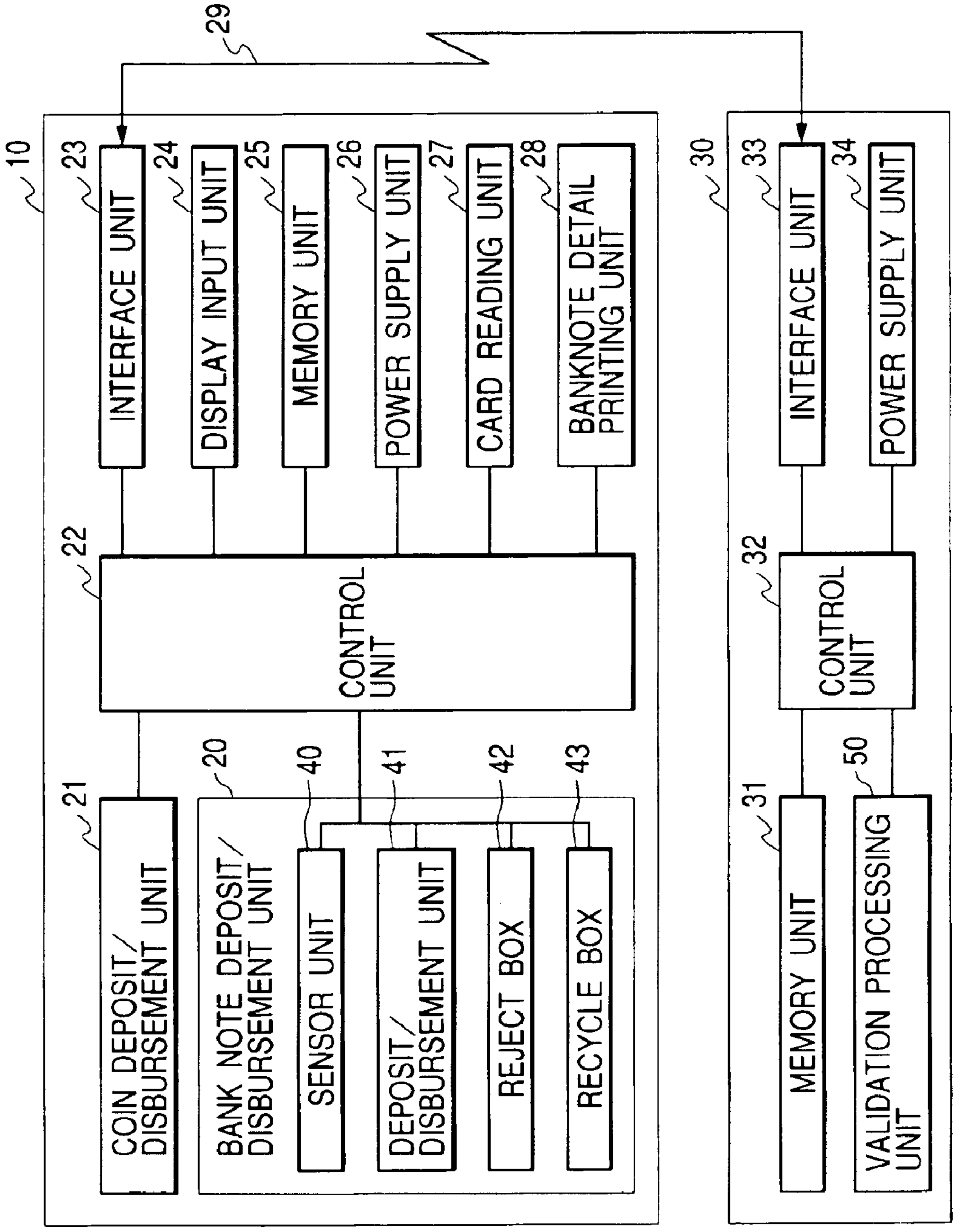
FIG. 2 is a detail block diagram of the automatic processing apparatus and the host computer illustrated in FIG. 1.

FIG. 2 illustrates a detail structure of the automatic processing apparatus and host computer in FIG. 1.

In FIG. 2, only one unit of the four automatic processing apparatuses 10 of FIG. 1 and any one unit (called a host computer 30) among the host computers 11, 14 of FIG. 1 are illustrated.

The host computer 30 is a general name of the computers such as the host computer 11 installed in a financial institution or in the management center 14 or the like. The automatic processing apparatus 10 is constituted of a bank note deposit/disbursement unit 20, a coin deposit/disbursement unit 21, a control unit 22, an interface unit 23, a display input unit 24 for displaying the manipulation guide images to execute the processing input, a memory unit 25, a power supply unit 26, a card reading unit 27 and a bank book detail printing unit 28. The bank note deposit/disbursement unit 20 is further constituted of a sensor unit 40, a deposit/disbursement slot 41, a reject box 42 and a recycle box 43 or the like. The automatic processing apparatus 10 is connected with the host computer 30 via a communication line 29 as the communication medium. The sensor unit 40 is formed of not only an image sensor such as a line sensor but also a magnetic sensor, an optical sensor and a combination of these elements. Therefore, the data transmitted to the host computers have been read with the sensors explained above. In the case of the optical sensor, the light beam which has been reflected from or passed through the bank note when the light beam is radiated thereto is received with a light receiving unit and the data obtained is transmitted to the host computer as the feature data.

In the automatic processing apparatus of the prior art, the validating unit including the sensor unit as a whole is installed within the bank note deposit/disbursement unit 20, while in the automatic processing apparatus of the present invention, the sensor unit which is one of the essential portion to form the validating unit is provided within the automatic processing apparatus 10. Therefore, the automatic processing apparatus transmits the feature information of bank note obtained from the sensor unit 40 to the host computer 30 via the interface unit 23 for making communication with the host computer 30.

Moreover, the host computer 30 is constituted of a memory unit 31 for storing the transferred data and the reference data to be referred for executing the validation process, a control unit 32 for controlling the entire portion of the apparatus, an interface unit 33 for making communication with the automatic processing apparatus 10, a power supply unit 34 and a validation processing unit 50 for validating bank note.

Figure 3:
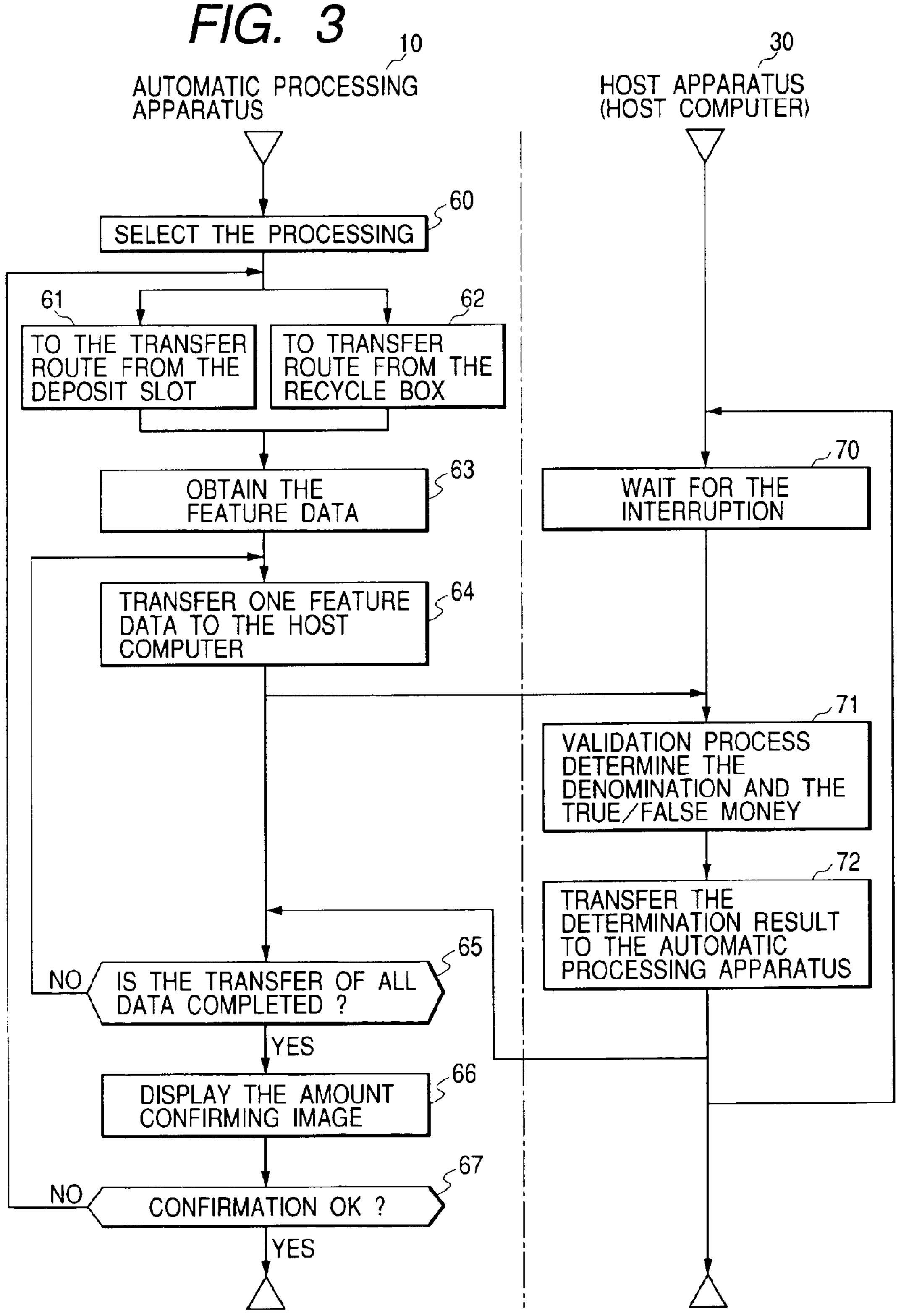
FIG. 3 is a processing flowchart of the automatic processing method indicating an embodiment of the present invention.

FIG. 3 is an operation flowchart of the automatic processing method as a preferred embodiment of the present invention.

In FIG. 3, the left side of the center line (broken line) indicates the processing operations of the automatic processing apparatus 10, while the right side of the center line indicates the processing operations of the host computer 30.

A user selects a key (selection of processing 60) for deposit or disbursement from the processing name keys displayed on the display input unit 24 of the automatic processing apparatus 10.

When the processing is selected, the control unit 22 moves, when the deposit processing is designated, the bank note placed at the deposit/disbursement slot 41 to the transfer route (step 61) and also moves, when the disbursement processing is designated, the bank note placed at the recycle box 43 to the transfer route (step 62).

The control unit 22 obtains, when the bank note placed in the course of the transfer passes the sensor unit 40, the feature data of each bank note in the memory unit 25. The control unit 22 further transfers the feature data of a sheet of bank note among those of the bank note obtained to the memory unit 31 of the host computer 30 via the communication line 29 connected to the interface unit 23 of the automatic processing apparatus 10 (step 64). In this case, the host computer 30 may be the host computer 11 of the financial institution or the host computer of the management center 14 or the like. Moreover, the apparatus ID is given to each apparatus and such apparatus ID is transferred simultaneously with the transfer of feature data corresponding to a plurality of automatic processing apparatuses.

The control unit 32 of the host computer 30 is in the condition to wait for the interruption (step 70) and then moves to the subsequent operation in such a timing as the transfer of feature data from the automatic processing apparatus 10.

The control unit 32 of the host computer 30 executes the validation process with the validation processing unit 50 to determine the denomination of bank note (determination for denomination) and determination of true and false money (determination for true/false bank note) (step 71). Result of validation obtained from the validation processing unit 50 is transferred to the memory unit 25 of the automatic processing apparatus 10 as the feature data transfer source via the communication line 29 connected to the interface unit 33 of the host computer 30 (step 72). The host computer 30 side transits in direct to the condition to wait for the interruption. The feature data transfer source makes determination based on the apparatus ID to be transferred simultaneously at the time of transferring the feature data. Thereby, it is now possible to use only one validation processing unit from a plurality of automatic processing apparatuses.

The control unit 22 of the automatic processing apparatus 10 confirms whether the result of determination is transferred or not for the feature data of all sheets of bank note for this processing (step 65). If the result is not transferred, the feature data of the next sheet of bank note is transferred to the host computer 30 (step 64).

When the result of determination of feature data is transferred for all sheets of bank note, the amount confirming image is displayed on the display input unit 24 (step 66). Here, it is confirmed whether a user has selected or not the confirmation key of the display input unit 24 of the automatic processing apparatus 10. When the confirmation key is selected, the control unit 22 completes the processing. If the confirmation key is not selected accurately, a user is urged to manipulate again the confirmation key (step 67).

In this embodiment, the feature data is transmitted sheet by sheet of the bank note to the host computer 30, but it is also possible to transmit the feature data of a plurality of sheets of bank note at a time to the host computer 30. In the case where the feature data is transmitted sheet by sheet of the bank note, it provides a merit that the waiting time of a user may be reduced because the feature data of the other bank note can be read while the feature data is transmitted. On the contrary, in the case where the feature data of a plurality of sheets of bank note is transmitted at a time, it provides a merit that since a plurality of sheets of bank note are summarized, the data transmitted from the other automatic processing apparatus is interrupted for discrimination process during execution of one processing in the host computer 30 and thereby the condition to wait for such validation process can be eliminated.

Figure 4:
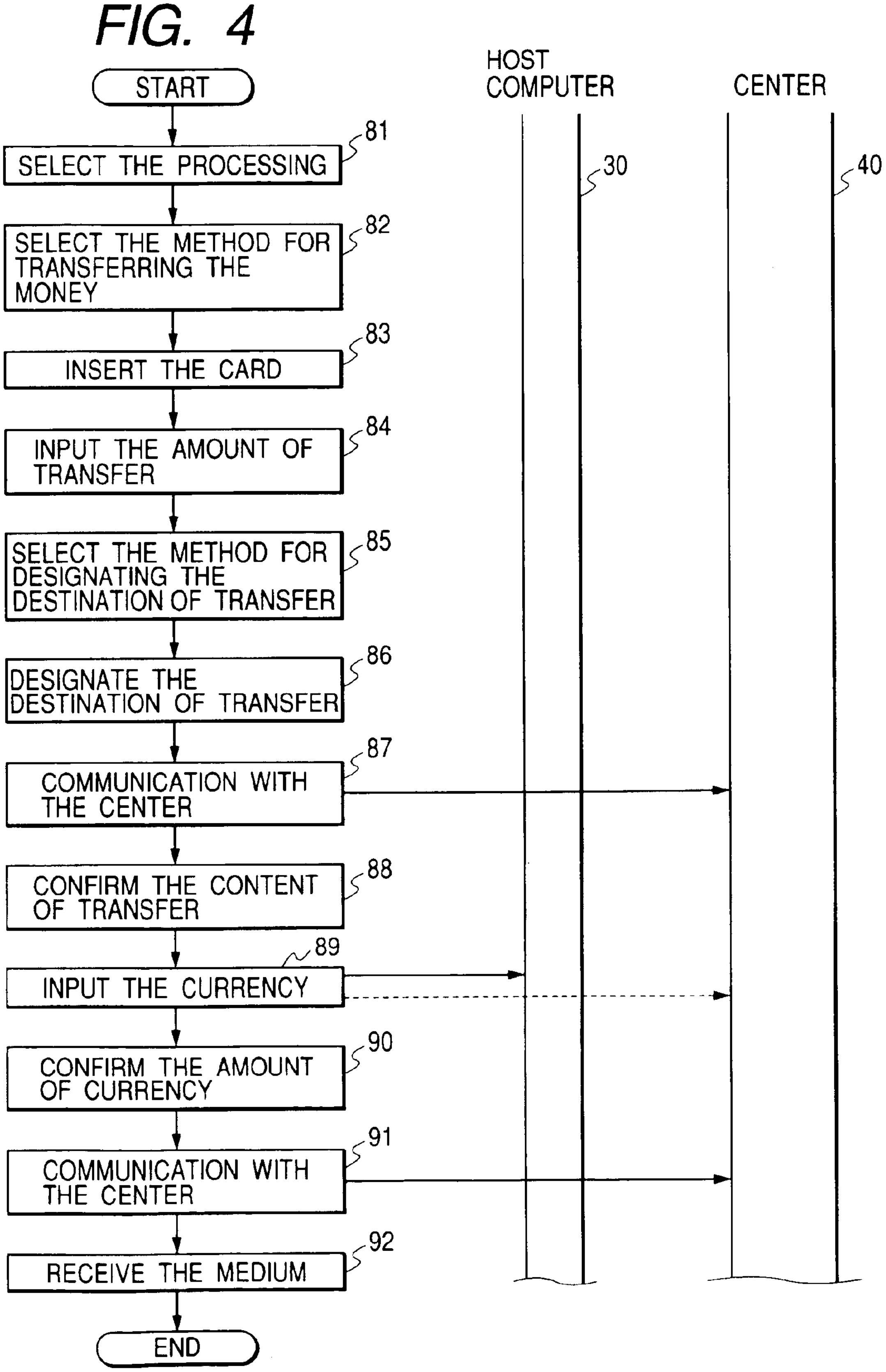
FIG. 4 is an operation flowchart of the money transfer process indicating the other embodiment of the present invention.

FIG. 4 is an operation flowchart of the money transfer processing as the other embodiment of the present invention.

Since the process in the host computer side is identical to that of FIG. 3, an explanation will be omitted and only the process in the automatic processing apparatus side will be explained in detail. A user first selects the "Transfer of Money" in the processing selection image by manipulating the display input unit 24 in the automatic processing apparatus 10 (step 81). Next, a user selects the "Transfer of Cash" by selecting the transfer of cash or transfer of money using a credit card depending on the guidance image (step 82). Next, in the case where only the transfer charge is paid using a credit card, a user inserts the transfer charge card (step 83). Next, a user inputs the mount of transfer (step 84) and selects the transfer destination designation method. For example, a user designates the transfer of money with the individual designation (step 85) and then inputs the account number of the transfer destination depending on the instruction and guidance for input depending on the touch-key image for transfer destination designating input (step 86). When the input manipulation up to this step is completed, the automatic processing apparatus 10 makes communication with the management center 40 via the communication line connected to the interface unit 23 and receives an answer message allowing the start of processing from the management center 40 (step 87).

Since the management center 40 only refers to the content of the relevant account number in the database, only a short period is required for the communication with the management center. When the response message allowing the start of processing is received, a confirmation image for confirming the content of money transfer processing is displayed on the display input unit 24, urging a user to confirm the content of money transfer processing (step 88). When a user inputs the result of confirmation following such request, the display image instructs and guides a user to put the cash. When a user puts the cash depending on such instruction and guidance (step 89), the automatic processing apparatus 10 reads the feature data of bank note including the image data with the sensor unit 40 and then transmits the feature data and apparatus ID number to the management center 40 or the other host computer 30 via the communication line connected to the interface unit 23.

Transmission to the host computer 30 is indicated with the arrow mark of a solid line and transmission to the management center 40 is indicated with the arrow mark of a broken line. A comparatively longer period is required for the discrimination process (determination for denomination and true/fault bank note) and moreover a still longer time is also required because of existence of the waiting time in the case where the discrimination of a plurality of automatic processing apparatuses is conducted with the host computers in the number less than such apparatuses or with a unit of host computer.

However, such waiting time can be reduced by reducing the number of automatic processing apparatuses assigned for only one unit of host computer.

When the data of all sheets of money is returned from the host computer 30 or 40 in the automatic processing apparatus 10, the confirmation image is displayed on the display input unit 24, urging a user to confirm the data (step 90). When a user confirms the amount of money and inputs the result of confirmation, the automatic processing apparatus 10 makes communication with the host computer 30 or 40 and receives the answer message for completing the processing from the host computer (step 91). Next, the end of transfer processing is displayed on the input display unit 24 with instruction and guidance for removing the detail processing slip and transfer charge card. Thereby, the entire part of processing is completed.

Here, in this embodiment, the discrimination processing is executed after confirming the account number, but it is also possible to confirm the account number after the discrimination process. In this case, there is provided a merit that the waiting time of user can be shortened with execution of the discrimination process in the host computer 30 during the account number confirming process.

As explained above, according to the present invention, (a) security can be improved because the validator for making validation is provided only in the host computer, (b) only modification of the validation processing unit in the host computer side is required when the features of bank note are changed or when measures for the bank note of each country is added and thereby the modification is required only for one or several areas and the working efficiency can be improved, and (c) it is no longer required to mount the validation processing unit (validation program) to each automatic processing apparatus and therefore a memory and a memory for work or the like are unnecessary and thereby manufacturing cost of each apparatus can be reduced.

What is claimed is:

1. An automatic currency processing system for processing a bank note using a host computer and an automatic processing apparatus, said automatic processing apparatus comprising:

a bank note transfer route for transferring the bank note for processing;

a reading unit for obtaining various features of the bank note being transferred on the bank note transfer route;

a first communication unit for transferring feature data obtained with said reading unit to said host computer;

a control unit for confirming the feature data based on a result transferred from said host computer;

wherein said host computer comprises;

a validating unit for executing a discrimination process to determine a denomination of the bank note and of true and false money by using the feature data transferred from said automatic processing apparatus; and a second communication unit for transferring a result of the discrimination process from said validating unit to said automatic processing apparatus.

2. An automatic currency processing system according to claim 1, wherein said second communication unit executes the discrimination process for a plurality units of said automatic processing apparatus in one or more validation processing units of said host computer to return the result of the discrimination process to each automatic processing apparatus depending on a discrimination number added to the feature data.

3. An automatic currency processing system according to claim 2, wherein said reading unit is provided with a magnetic sensor to obtain the feature data from the bank note.

4. An automatic currency processing system according to claim 2, wherein said reading unit is provided with an image sensor to obtain the feature data from the bank note.

5. An automatic currency processing system according to claim 4, wherein said feature data is image data of the bank note.

6. An automatic currency processing system according to claim 1, wherein said automatic processing apparatus transmits the feature data of the bank note to said host computer.

7. An automatic currency processing system according to claim 1, wherein said host computer is a server installed at a business branch.

8. An automatic currency processing system according to claim 1, wherein said host computer is installed one of a financial institution and a management center.

9. An automatic currency processing system according to claim 1, wherein said reading unit is provided with an optical sensor to obtain the feature data of the bank note.

10. An automatic currency processing system according to claim 9, wherein said feature data is data of an optical beam reflected from the bank note or data of an optical beam passed through the bank note.

11. An automatic processing apparatus for communicating with a host computer in an automatic currency processing system, comprising:

a bank note transfer route for transferring a bank note for processing;

a reading unit for obtaining various features of the bank note being transferred on the bank note transfer route;

a communication unit for transferring feature data obtained with said reading unit to said host computer, and for receiving a result of validation including determination of denomination of the bank note and of true and false money transferred from said host computer; and a control unit for confirming whether the feature data is correct, based on said result of validation.

12. An automatic processing apparatus according to claim 11, wherein said feature data is transmitted to said host computer after said communication unit provides its identification number to said host computer.

13. An automatic processing apparatus according to claim 11, wherein said feature data of each bank note is transmitted to said host computer.

14. An automatic processing apparatus according to claim 11, wherein said reading unit is provided with an optical sensor to obtain the feature data of the bank note.

15. An automatic processing apparatus according to claim 14, wherein said feature data is data of an optical beam reflected from the bank note or data of an optical beam passed through the bank note.

16. An automatic processing apparatus according to claim 11, wherein said reading unit is provided with a magnetic sensor to obtain the feature data from the bank note.

17. An automatic processing apparatus according to claim 11, wherein said reading unit is provided with an image sensor to obtain the feature data from the bank note.

18. An automatic processing apparatus according to claim 17, wherein said feature data is image data of the bank note.

19. An automatic processing apparatus comprising:

a sensor unit provided with a scanner for obtaining image data to validate a bank note as a processing object;

an interface unit provided to interface with a host computer; and a control unit for instructing transmission, to said host computer, of the image data obtained with said sensor unit, via said interface unit, and for processing the bank note using a result of validation including determination of denomination of the bank note and of true and false money received from said host computer.

20. An automatic processing apparatus according to claim 19, further comprising:

a deposit slot for depositing the bank note;

wherein said sensor unit obtains image data of the bank note deposited from said deposit slot.

21. An automatic processing apparatus according to claim 19, wherein said sensor unit is provided with a magnetic sensor, and wherein said interface unit transmits data obtained with said sensor unit to said host computer.

22. An automatic processing apparatus according to claim 19, wherein said sensor unit is provided with an optical sensor, and wherein said interface unit transmits data obtained with said optical sensor to said host computer.

23. An automatic processing apparatus for communicating with a host computer in an automatic currency processing system, comprising:

a bank note transfer route for transferring a bank note for processing;

a reading unit for obtaining various features of the bank note being transferred on the bank note transfer route;

a communication unit for transferring feature data obtained with said reading unit to said host computer after providing its identification number, and for receiving a validation result including determination of denomination of the bank note and of true and false money transferred from said host computer; and a control unit for confirming whether the feature data is correct, based on said validation result.

24. An automatic processing apparatus for processing a bank note, comprising:

a deposit slot for receiving the bank note;

a sensor unit for obtaining validation data for validating the bank note deposited from said deposit slot;

an interface unit provided to interface with a host computer; and a control unit for instructing transmission, to said host computer, of the validation data obtained with said sensor unit, via said interface unit, and for processing the bank note using a validation result including determination of denomination of the bank note and of true and false money received from said host computer.

* * * * *